United States Patent
Kwatra et al.

(10) Patent No.: US 11,488,331 B2
(45) Date of Patent: Nov. 1, 2022

(54) SMART INTERACTIVE SIMULATION-BASED CONTENT ON A FLEXIBLE DISPLAY DEVICE

(71) Applicant: International Business Machines Corporation, Armonk, NY (US)

(72) Inventors: Shikhar Kwatra, San Jose, CA (US); Jeremy R. Fox, Georgetown, TX (US); Craig M. Trim, Ventura, CA (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 3 days.

(21) Appl. No.: 17/087,680

(22) Filed: Nov. 3, 2020

(65) Prior Publication Data
US 2022/0138993 A1 May 5, 2022

(51) Int. Cl.
*G06T 11/00* (2006.01)
*G06T 7/60* (2017.01)
*G06F 3/041* (2006.01)
*G06V 20/00* (2022.01)

(52) U.S. Cl.
CPC .......... *G06T 11/00* (2013.01); *G06F 3/0414* (2013.01); *G06T 7/60* (2013.01); *G06V 20/00* (2022.01); *G06F 2203/04102* (2013.01); *G06T 2200/24* (2013.01)

(58) Field of Classification Search
CPC ....... G06T 11/00; G06T 7/60; G06T 2200/24; G06V 20/00; G06F 3/0414; G06F 2203/04102
See application file for complete search history.

(56) References Cited

U.S. PATENT DOCUMENTS

| | | | |
|---|---|---|---|
| 2003/0088389 A1* | 5/2003 | Balaniuk | G06T 17/20 703/2 |
| 2008/0062169 A1* | 3/2008 | Heesemans | G06F 3/0488 345/420 |
| 2010/0231541 A1* | 9/2010 | Cruz-Hernandez | G06F 3/04855 345/173 |
| 2016/0132179 A1* | 5/2016 | Bostick | G06F 3/041 345/419 |
| 2018/0012393 A1 | 1/2018 | Hosoya | |
| 2018/0157317 A1 | 6/2018 | Richte et al. | |
| 2019/0073035 A1 | 3/2019 | Modarres et al. | |
| 2019/0188450 A1* | 6/2019 | Spivack | G06V 40/103 |
| 2021/0117002 A1* | 4/2021 | Eagleman | G06F 3/016 |

FOREIGN PATENT DOCUMENTS

WO 2020098246 A1 5/2020

* cited by examiner

*Primary Examiner* — Afroza Chowdhury
(74) *Attorney, Agent, or Firm* — Cantor Colburn LLP; Erik Johnson (57) ABSTRACT

Aspects of the invention include a computer-implemented method including receiving image data describing an image on a flexible display and force data describing a force applied to the flexible display. The force is associated with a target object in the image, wherein the object is an image of a real-world object. A rendering of the target object is created as if the force were applied to the real-world object.

16 Claims, 4 Drawing Sheets

SMART INTERACTIVE SIMULATION-BASED CONTENT ON A FLEXIBLE DISPLAY DEVICE

BACKGROUND

The present invention generally relates to programmable computing devices, and more specifically, to programmable computing devices configured for smart interactive simulation-based content on a flexible display device.

Flexible electronic devices are a technology, in which the electronic components submit to deformation of the device without losing their functionality. One aspect of flexible electronics are flexible displays. A flexible display for a computing device includes a plurality of pixels that are formed on a thin and flexible substrate, for example, a plastic. The flexible display is designed to withstand a user folding, bending, or twisting the display without breaking or degrading performance. Therefore, even when the flexible display is deformed, the computing device can display a desired image. Various computing devices incorporate flexible displays in consumer and industrial applications, for example, television displays, electronic paper, and foldable smartphone displays.

SUMMARY

Embodiments of the present invention are directed to smart interactive simulation-based content on a flexible display device. A non-limiting example computer-implemented method includes receiving image data describing an image on a flexible display and force data describing a force applied to the flexible display. The force is associated with a target object in the image, wherein the object is an image of a real-world object. A rendering of the target object is created as if the force were applied to the real-world object.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products for creating a visual rendering of an image of an object as is a real-world force had been applied to the object.

Flexible computing devices include electronic devices that have a range in degrees of flexibility. Certain flexible electronic devices can bend to a certain curvature, but would break if bent too much. Other flexible device can be folded such that one portion of a display faces another portion of the display. Flexible computing devices have numerous inherent advantages that cannot be achieved by rigid devices. Flexible computing devices can offer better absorption of bending forces, thinner devices, and greater options for storing the devices. However, conventional flexible computing devices are designed to have displays that resist changing a displayed image based on a deformation of the display. Therefore, even if a user deformed a flexible screen, an object image is unaffected by the force applied by the user. By resisting changing an image to conform to a deformation of a display, flexible computing devices are surrendering a useful application of these computing devices.

One or more embodiments of the present invention address one or more of the above-described shortcomings by providing computer-implemented methods, computing systems, and computer-program products that translate a force applied to a flexible display to a generate a rendering as if the force was applied to the real-world object displayed on the flexible display. The herein described system can receive a force input directed at an object on a flexible display. The system can determine whether the force exceeds a threshold force that would cause deformation or damage to the real-world object. If the applied force exceeds the threshold, the system can render an image as if the force were applied to the real-world object. In this sense, a user can visualize an impact of a real-world force on a real-world object without having to actually apply the force to the object.

Figure 1:
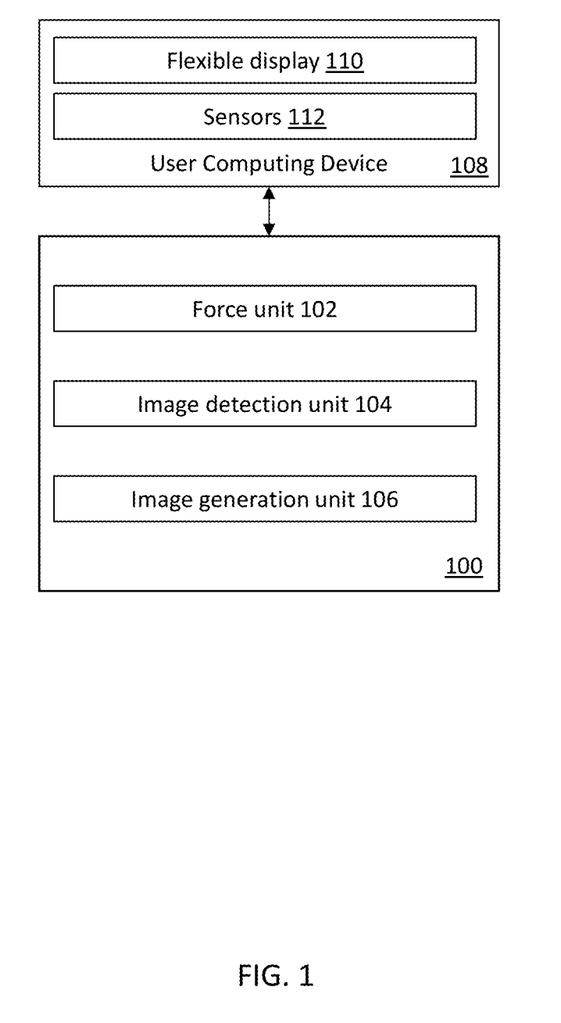
FIG. 1 illustrates a block diagram of components of a system for generating a rendering on a flexible display in accordance with one or more embodiments of the present invention.

Turning now to FIG. 1, a system 100 for generating a simulated content rendering on a flexible device is generally shown in accordance with one or more embodiments of the present invention. The system 100 includes a force unit 102 for determining a magnitude and a direction of a force applied to a flexible display 110. The system 100 includes an image detection unit 104 for identifying objects in an image displayed on the flexible display 110. The system 100 further includes an image generation unit 106 for generating a rendering of an object upon which a force has been applied via the flexible display 110.

The force unit 102 is operable to receive a force data from a sensor(s) 112 in communication with the flexible display 110. The force data can be generated based on a response to a user deforming the flexible display 110. The force data can be used to describe a force vector, including a magnitude and direction of the force. The force data can include multiple signals from multiple sensors 112. For example, an angular velocity can be determined by a gyroscope sensor, whereas a magnitude can be determined by a capacitive sensor.

The force unit 102 can extract features from the force data to determine a direction of a force applied to a flexible display 110. The force unit 102 makes the determination of the force based on a signal pattern of the force data. The force unit 102 can receive a signal pattern of the force data and compare the signal pattern to a database of stored signal patterns. For example, the force unit 102 can receive a signal pattern indicating a uniform force being applied to a single portion of the flexible display 110. The force unit 102 can access a data structure, for example, a table and compare the signal pattern to stored signal patterns. In this instance, the force unit 102 can conclude that a downward force is being applied to a plane of the flexible display 110. In other instances, the force unit 102 can be configured to apply a machine learning algorithm to determine a force direction. For example, a user can swipe a flexible display in a left to right direction. In this instance, the sensors 112 can observe force data being sequentially received from a left side of the flexible display 110 to a right side. In this instance, the force unit 102 can extract features from the signal pattern and determine that a force is being applied from a left side of the flexible display 110 to a right side.

The force unit 102 can further extract features to determine a magnitude of the force applied to a flexible display 110. The force unit 102 can determine a magnitude based on various characteristics of the force data. The characteristics include a time interval of a force is applied to the flexible display 110. For example, the force unit 102 can relate a magnitude of a force to a threshold time interval. If, for example, the force unit 102 determines that a time interval of a force signal is below a first threshold, the force unit 102 can determine that a force has a first magnitude. If the force unit 102 determines that the time interval is greater than the first threshold, the force unit 102 can determine that the force has a second magnitude, where the second magnitude is greater than the first magnitude. This pattern can repeat for any desired number of thresholds. In other instances, the force unit 102 can equate a velocity of a deformation of the flexible display 110 with a magnitude. For example, the force unit 102 can detect an angular velocity of a bending or folding of the flexible display 110. If the force unit 102 determines that a velocity below a second threshold, the force unit 102 can determine that the force has a third magnitude. If the force unit 102 determines that the velocity is greater than the second threshold, the force unit 102 can determine that the force has a fourth magnitude, where the fourth magnitude is greater than the third magnitude. This pattern can repeat for any desired number of thresholds.

The force unit 102 can further extract features to determine a positioning of the force on the flexible display 110. The force unit 102 can determine a position of the force based on various methods for different flexible display technologies. For example, resistive, capacitive, and infrared-based flexible displays employ grid patterns of sensors 112 along the flexible display 110. The force unit 102 can determine a location of the force based on a positioning of the sensors 112 that generated the force data. A surface acoustic wave-based flexible display monitors sound waves and reflections of the soundwaves at the edge of the flexible display 110. In this instance, the force unit 102 can determine a position on a time interval between a soundwave being emitted from a source and a reflection signal being received at the source. Various other methods can be employed to determine a position of a force on the flexible display 110.

In some embodiments of the present invention, the force unit 102 can apply machine learning techniques to determine the characteristics of the force. The force unit 102 can further use the neural network to generate a force embedding vector that can be translated in an embedding space. The force embedding vector can include one or more of the above described force characteristics. By representing the force characteristics by the embedding vector in the embedding space, the system 100 can associate the force data with image data.

The image detection unit 104 can receive an image displayed on a flexible display 110 and employ a model to identify objects in the image. The objects are real world-items and not illustrations, computer-generated images, or an abstract rendering of real-world items. The real-world objects are objects that can be captured by visible light reflecting off of the real-world object and being received an image capturing device, for example, a camera of a smartphone. In some embodiments of the present invention, the image detection unit 104 can employ a model that executes computer vision techniques on the image for object detection. Object detection includes both image classification and object localization. Image classification includes predicting a class of one or more objects in the image. To perform image classification, the image detection unit 104 can receive the image as an input and outputs a class label in the form of one or more integer values mapped to class values. Object localization includes identifying a location of the one or more identified objects in the image. To perform object localization, the image detection unit 104 can receive the image and output one or more bounding boxes, which define a spatial relationship of the objects.

The image detection unit 104 can be trained to detect and classify object in an image. The image detection unit 104 can further be trained to determine a potential class or classes of material of an object. For example, if the image detection unit 104 identifies an object in an image as a vase, the image detection unit 104 can further determine that the vase is composed of clay. The determination can be based in part on the class of the object and a class of other objects in the image. The image detection unit 104 can determine potential classes of material of an object based on an identity of the object and features extracted from the object. The potential classes of material can be scored based on a probability of the object being formed of the material. The image detection unit 104 can select the k-highest scores for potential materials. If a score suggests that a probability is lower than a fifth threshold amount, the potential material can be disregarded. For example, if the object is a brick, the highest score would suggest that the brick is made from clay and shale. If no other material has a score that indicates a probability higher than the fifth threshold, the other materials can be disregarded as potential materials. If, however, an object was a vase, it is reasonable to assume that probabilities for clay and glass are expected to be greater than the fifth threshold. In this instance, the image detection unit 104 can analyze other objects in the image to adjust the probabilities. For example, if the vase is arranged next to a kiln, a probability that the vase is made from clay can be increased, and the probability that the vase is made from glass can be decreased. If, however, the vase is arranged next to a glass blowing device, a probability that the vase is made from glass can be increased, and the probability that the vase is made from clay can be decreased The image detection unit 104 can be implemented through a neural network type architecture with input, hidden, and output layers. An exemplary embodiment, the image detection unit 104 employs a trained artificial neural network to execute the model, for example, a region-based convolutional neural network (R-CNN), or other neural network appropriate for image analysis. The R-CNN generally operates in three phases. First, the R-CNN analyzes the image, extracts independent regions in the image, and delineates the regions as candidate bounding boxes. Second, the R-CNN extracts features, for example, using a deep convolutional neural network, from each region. Third, a classifier, for example, a support vector machine (SVM), is used to analyze the features and predict a class for one or more objects in a region.

The image detection unit 104 can receive images stored on the user computing device 108, images retrieved from an external source, for example, an external storage unit or the internet. The image detection unit 104 can further receive images captures by the user computing device 108 by an image capturing feature. For example, the user computing device 108 can be a smartphone, which includes a camera to capture images. The image detection unit 104 can detect objects on images captured by the camera.

The image detection unit 104 can further analyze other objects in an image to determine whether the other objects would impact a force applied to an object. The image detection unit 104 can further be trained to determine whether the object is applying a force to a target object, or would apply if reactive force if a force were to be applied to the target object. For example, a target object can be a beam lying across two supports. The image detection unit 104 may detect a weight-bearing load positioned on top of the beam. In this instance, the weight bearing load is applying a force to the beam. In another instance, the target object may be a vertically positioned beam, and the image detection unit 104 may detect a horizontally positioned brace on one side of the beam. In this instance, the brace may apply a reactive force if a force is applied to the beam.

In some embodiments of the present invention, the image detection unit 104 can apply machine learning techniques to determine the characteristics of the image. The image detection unit 104 can further use the neural network to generate an image embedding vector that can be translated into the same embedding space as the force embedding vector. Therefore, the system 100 can associate the force data with the image data.

The image generation unit 106 is operable to receive data from the force unit 102 and the image detection unit 104 and generate a rendering of a target object. The image generation unit 106 can receive force data from the force unit 102, which can include a magnitude, a direction, and a location of the force on the flexible display 110. The image generation unit 106 further receives image data from the image detection unit 104, which can include description objects, including their respective locations on an image, object labels, object properties, and potential object materials.

The image generation unit 106 can provide a classifier to determine a relationship between the image data and the force data. The classifier can be trained to determine the relationship between forces and objects. Based on the determination by the classifier, the image generation unit 106 can map the location of the force to the image data to compare a location of the force to objects in the image. The identification of the target object is based at least in part on the location of the force, but also a deformation of the flexible display 110. If the location of the force maps to the location of an object, the image generation unit 106 can conclude the object is a target object. For example, if a user is pressing down on a vase in an image, the image generation unit 106 can conclude that the vase is the target object. In other instances, a force signal may not correlate to an object. For example, if a user can grip the ends of a flexible display 110 and bend the flexible display 110. However, no objects may be visible on the portions of the flexible display 110 that the user gripped. In this situation, the location of the force is distinct from the location of the deformation. The image generation unit 106 can look to the force data and determine that the flexible display 110 has been bent. The image generation unit 106 can then determine whether the bend traverses an object. For example, if the flexible display 110 is bent along the middle, the image generation unit 106 can determine whether any objects are displayed in the middle of the display.

The image generation unit 106 is further operable to consider a material of the object in generating the rendering. As described above, the image detection unit 104 can determine a class of material of the object. The material can determine a manner in which an object deforms or breaks. For example, a crystalline solid will break differently than an amorphous solid. Additionally, an object made from steel may tend to bend before breaking, whereas the same object made from iron may break under the same force that causes the steel object to only bend. The image generation unit 106 can further provide a user with an option of viewing different rendering based on different materials. The image generation unit 106 can cause a graphical user interface to provide a user with a selection of materials. The image generation unit 106, in response to receiving a material selection, can provide a rendering based on the material.

In some embodiments of the present invention, the image generation unit 106 can approximate a physical system. The physical system can include two or more physical objects that interact in response to applying a force to at least one physical object. Using the example above, the physical system can be the beam and the brace. The image generation unit 106 can receive inputs and simulate an output describing a reaction based on the inputs. The inputs can be, for example, a respective geometry, material, and position of a target object and a second object. The input can further include a force applied to the target object by the user and/or by the second object. The output can include a visual depiction of the deformation or breaking of the target object.

In some embodiments of the present invention, the image generation unit 106 can detect contact between a target object and at least one second object. The image generation unit 106 can receive a force input generated by a user on a target object. Based on the force and determined characteristics (e.g., size of target, geometry of target object, material of target object, location of force applied on a target object, time duration of force), the image generation unit 106 can calculate various quantities (velocity, momentum, acceleration). The image generation unit 106 can use various relationships to determine the quantities. For example, the image generation unit 106 can apply Newton's second law, and equations for rotational force. The image generation unit 106 can receive inputs and calculate the vector sum of the forces and moments acting on the target object. The image generation unit 106 can apply the vector sums to solve equations of motion for linear and angular acceleration of the target object. The image generation unit 106 can then integrate the target object's acceleration and velocity with respect to time to determine the target object's linear and angular velocity.

The image generation unit 106 can be trained to consider other objects in an image, and whether the at least one second object would affect a deformation or breaking of the target object. The determination can be based at least in part on a magnitude of a force applied by a user. The image generation unit 106 can further determine whether a material of the target object or second object would contribute to a deformation or breaking of the target object.

The image generation unit 106 can further determine if the target object makes contact with a second object based on either the target object and second object being in contact in the image or the linear and angular velocity of the target object. Using the linear and angular velocity, the image generation unit 106 can determine each possible second object that the target object makes contact with. The image generation unit 106 can detect each bounding box within a direction of the target object. The bounding boxes include at least one second object. The image generation unit 106 can further construct a tree like data structure for each potential bounding box within the direction of the target object. The image generation unit 106 can further be trained to predict, calculate and/or retrieve from an external source various quantities such as mass and collision-normal vector. The quantities need not be exact and the image generation unit 106 can apply a heuristics process to predict the quantities. The image generation unit 106 can apply these quantities to determine which second object, the target object makes contact with.

For example, a target object may only be likely to deform if the magnitude of the force exceeds the sixth threshold, or break if the magnitude exceeds a seventh threshold the image generation unit 106, where the seventh threshold is greater than the sixth threshold. In this instance, if the force applied by the user does not exceed the sixth threshold, the image generation unit 106 can elect to not alter the image of the target object. In the instance that the magnitude exceeds the sixth threshold, the image generation unit 106 can generate a rendering of a deformed object. Deformed includes bending, depressions, and possibly minor cracks, but the target object is not broken into separate pieces. In the instance that the magnitude exceeds the seventh threshold, the image generation unit 106 can generate a rendering of a broken target object. Broken includes major cracks and that the target object is broken into separate pieces.

In the example above, the image generation unit 106, may detect a second object that affects deformation or breaking by the force. The image generation unit 106 can be trained to determine an appropriate threshold based on the presence or absence of other objects. The image generation unit 106 can be trained to determine an appropriate threshold and breakage pattern based on the properties of target object and second object. For example, a wooden beam can be positioned against a single angled edge. If a force is applied to both sides of the beam around the edge, the beam is likely to split at single point along the edge. In another example, the wooden beam can be positioned against a face of a wooden block. If a force if applied both sides of the beam around the face of the block, the beam is likely to split at two points along the edges of the block.

Additionally, the image generation unit 106 can take into consideration a material of the target object or other object and the impact of the material on each other. For example, if the target object includes steel and the other object is a flexible foam braced against the target object, any resistive force caused by the flexible foam is negligible. The image generation unit 106 would not have to adjust a threshold magnitude of the steel in the presence of the foam or account for changes in deformation or breakage pattern. If, however, the target object is a mirror, and the second object is a pointed diamond braced against the mirror, the resistive forces are not negligible. In this instance, the image generation unit 106 would decrease the threshold magnitude from a threshold magnitude for the mirror with no other object in the image.

In some embodiments of the present invention, the image generation unit 106 can be implemented as a generative adversarial network (GAN). GANs utilize two neural networks, a generative network and a discriminative network, to compete with each other. The generative network inputs random data, including noise, and attempts to generate data across a desired probability distribution. The discriminative network inputs real data, including training data and discriminates between instances from the real data distribution and data produced by the generator. The GAN's objective is to cause the discriminative network to accept its generated data as real data. On the other hand, the discriminative network's objective is to recognize pattern differences between the real data and generated data to discern between the real and generated data. The GAN can be trained to received force and object feature data and to generate renderings of objects, as the force was applied to the object.

As used herein, "machine learning" broadly describes a function of electronic systems that learn from data. A machine learning system, engine, or module can include a machine learning algorithm that can be trained, such as in an external cloud environment (e.g., the cloud computing environment 50), to learn functional relationships between inputs and outputs that are currently unknown. In one or more embodiments, machine learning functionality can be implemented using an artificial neural network (ANN), having the capability to be trained to perform a currently unknown function. In machine learning and cognitive science, ANNs are a family of statistical learning models inspired by the biological neural networks of animals, and in particular, the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons is then passed to other downstream neurons, which are often referred to as "hidden" neurons. This process is repeated until an output neuron is activated. The activated output neuron determines which character was read.

The user computing device 108 can include a flexible display 110 and sensor 112. The flexible display 110 includes a plurality of pixels that are formed on a thin and flexible substrate, and is designed to withstand folding, bending, or twisting without degrading a performance of the display. The flexible display 110 can include flexible liquid crystal display, a flexible plasma display, a flexible organic light emitting display, a flexible electrophoretic display, and a flexible electro-wetting display. The sensors 112 include capacitive sensors, gyroscope, accelerometers, resistive sensors, light-based, sensors, audio sensors, infrared sensors, or other appropriate sensors. The user computer device 108 can be any electronic computing device, for example, a smartphone, electronic paper tablet.

Figure 2:
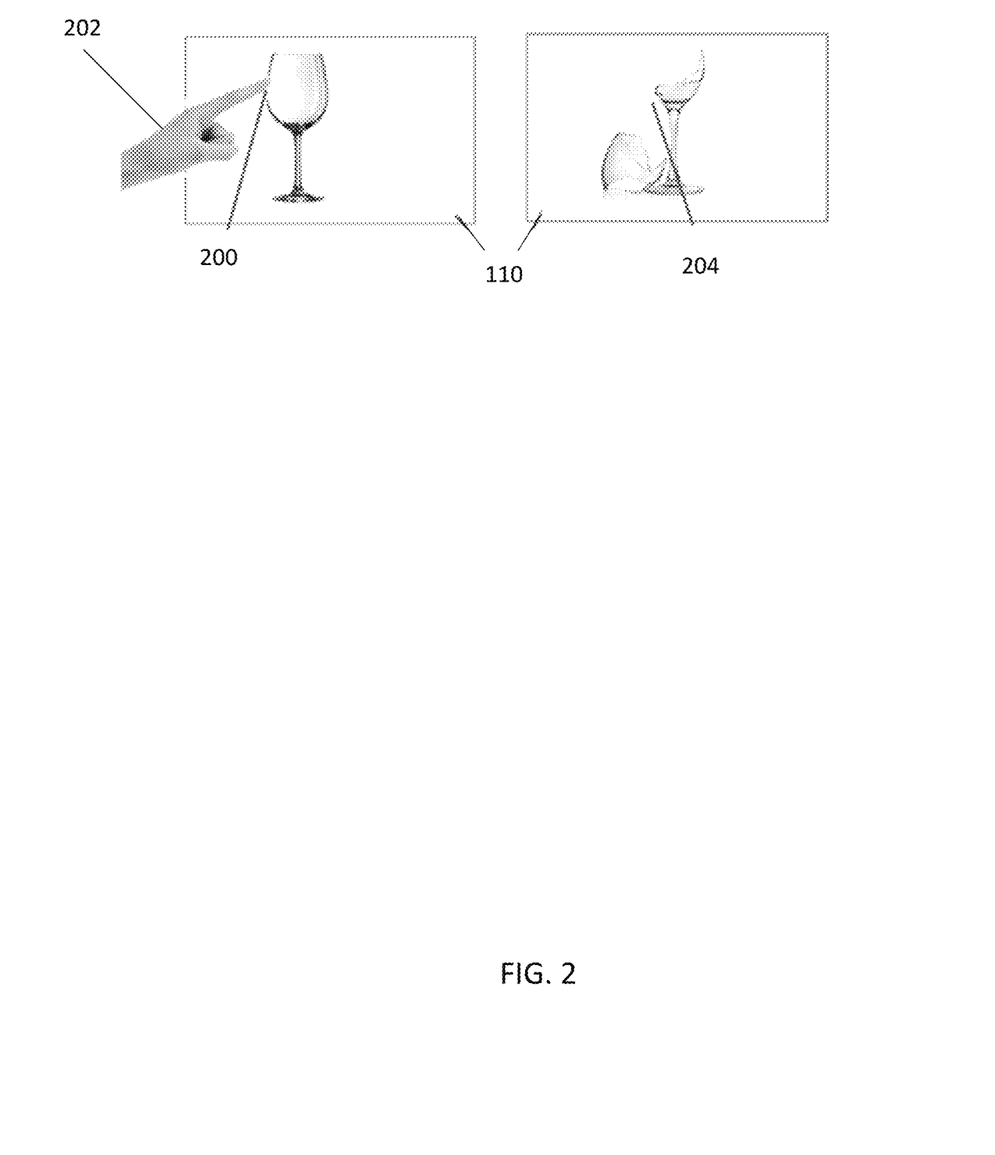
FIG. 2 illustrates an original image and a rendered image on a flexible display in accordance with one or more embodiments of the present invention.

Referring to FIG. 2, an illustration of an original image 200 and a rendering 204 displayed on a flexible display 110 is shown. As shown, a user 202 is applying a force to deform the flexible display 110. The force is being applied at a side surface of a wine glass. Based on the positioning of the force in relation to the original image 200, the system 100 generates a rendering 204 of the wines glass as if the force had been applied to the actual wine glass. As seen, the material properties of glass are considered in determined a break pattern of the wine glass.

Figure 3:
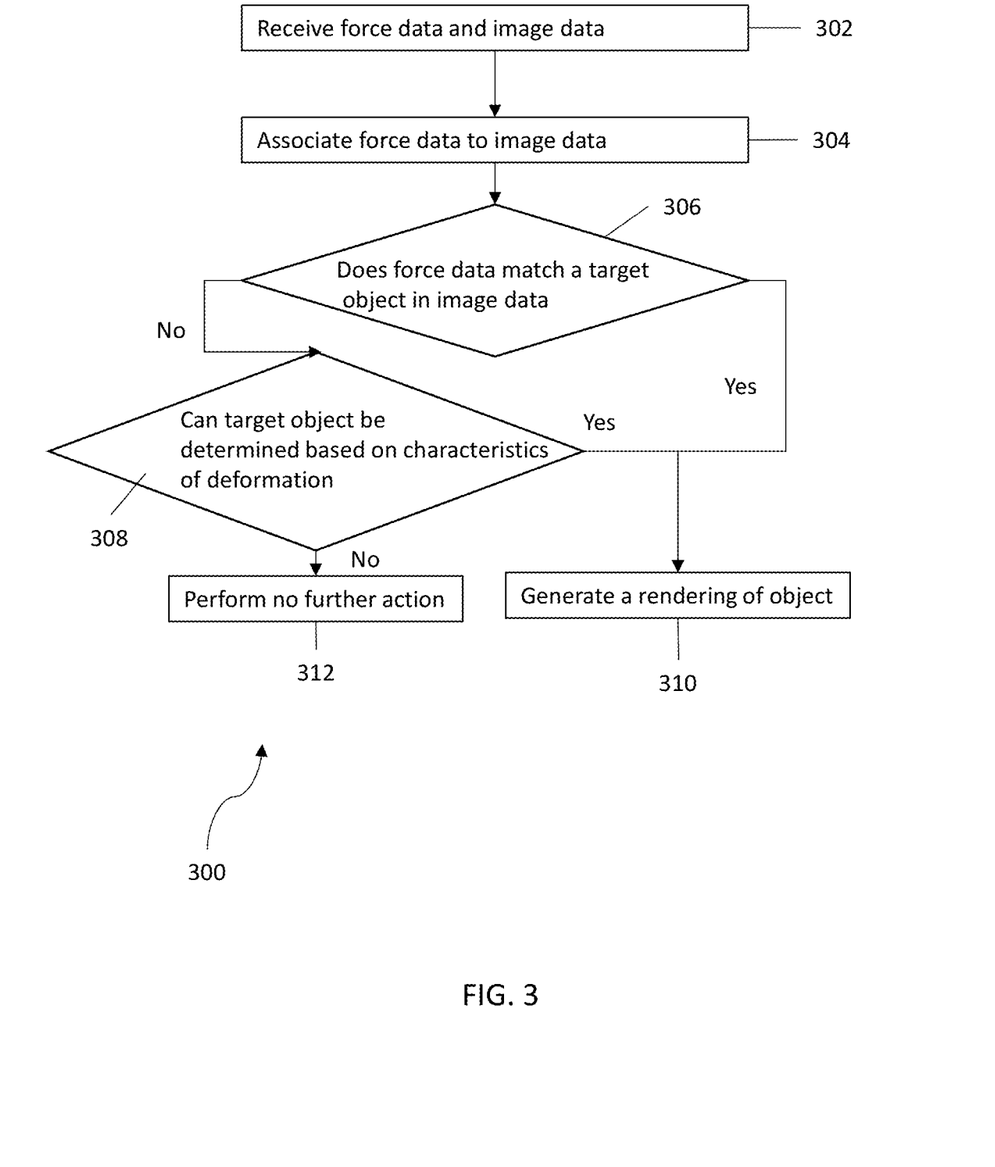
FIG. 3 illustrates a flow diagram of a process for generating a rendering on a flexible display in accordance with one or more embodiments of the present invention.

Referring to FIG. 3, a process 300 for generating a rendering on a flexible display in accordance with one or more embodiments of the present invention is shown. It should be appreciated that all or a portion of the processing shown in FIG. 3 can be performed by a computer system, such as system 100 of FIG. 1. At block 302, the force unit 102 can receive a signal describing force data from sensors 112 of a computing device 108. The force unit 102 can extract features from the force data describing a magnitude, a direction, and a location of a force applied to a flexible display 110. Additionally, the image detection unit 104 can receive image data describing an image displayed on the flexible display 110. The image detection unit 104 can extract features from the image data to determine an identity of objects in the image and a location of the objection. The image can be an image previously stored on the user computing device 108, or the image can be an image contemporaneously captured by the user computing device. The identity of the objects can further include properties of the objects, including material properties, mass, geometry, and other properties. The force unit 102 and the image detection unit 104 can further convert the force data and image data into embedding vectors in a same embedding space.

At block 304, the image generation unit 106 can receive the force data and the image data, for example, in the embedding vector format. The image generation unit 106 can associate the force data with the image to determine where the force is being applied to the image. The image generation unit 106 can further write a data structure, such a pointer, to point force data to associated image data, and vice versa.

At block 306, the image generation unit 106, can determine whether the force data is associated with an object. For example, if the force data is generated from a same location on the flexible display 110 as an object, the image generation unit 106 can determine that the object is a target object and proceed to block 310. If, however, the force data is not generated from the same location on the flexible display 110 as an object, the method proceeds to block 308.

At block 308, the image generation unit 106 determines a target object based on the effects of the deformation of the flexible display 110. For example, a user can have rotated ends of the flexible display 110 is opposite directions to cause a bend in the display. The image generation unit 106 can determine the location of the bend based on data from the sensors 112. In another instance, a user may stretch the flexible display 110. The image generation unit 106 can determine the central zone of the stretching action. In other words, the area of the flexible display 110 that is stretched apart the greatest. The image generation unit 106 can then determine whether the location of the bend or central stretch zone matches the location of an object. If the location of the bend or central stretch zone matches the location of an object, the method proceeds to block 310. If the location of the bend or central stretch zone does not match the location of an object, the method proceeds to block 312, where no further action is performed.

At block 310, the image generation unit 106 creates a rendering of the target image in view of an applied force. The deformation or breaking of the target image is based at least in part on the force data. The image generation unit 106 can first determine a threshold magnitude of force to cause deformation or breaking. The image generation can take into account the properties of the target object and any other object in the image to make the determination. The image generation unit 106 then determines whether the user has applied to sufficient magnitude of force to exceed one or more threshold. If the user has not applied a sufficient magnitude of force to exceed any threshold, the image generation unit 106 does not generate a rendering. If the user has applied a sufficient magnitude of force to exceed any threshold, the image generation unit 106 creates a rendering commensurate with the exceeded threshold level. For example, the image generation unit 106 can determine a magnitude of force needed to exceed a first threshold, but not a second threshold that would cause the target object to deform. The image generation unit 106 can also determine a magnitude of force needed to exceed a second threshold that would cause the target object to break. If the magnitude of force applied by the user on the flexible display 110 exceeded the first threshold, but not the second threshold, the image generation unit 106 would create a rendering of a deformed target object. If the magnitude of force applied by the user on the flexible display 110 exceeded the second threshold, the image generation unit 106 would create a rendering of a broken target object.

Figure 4:
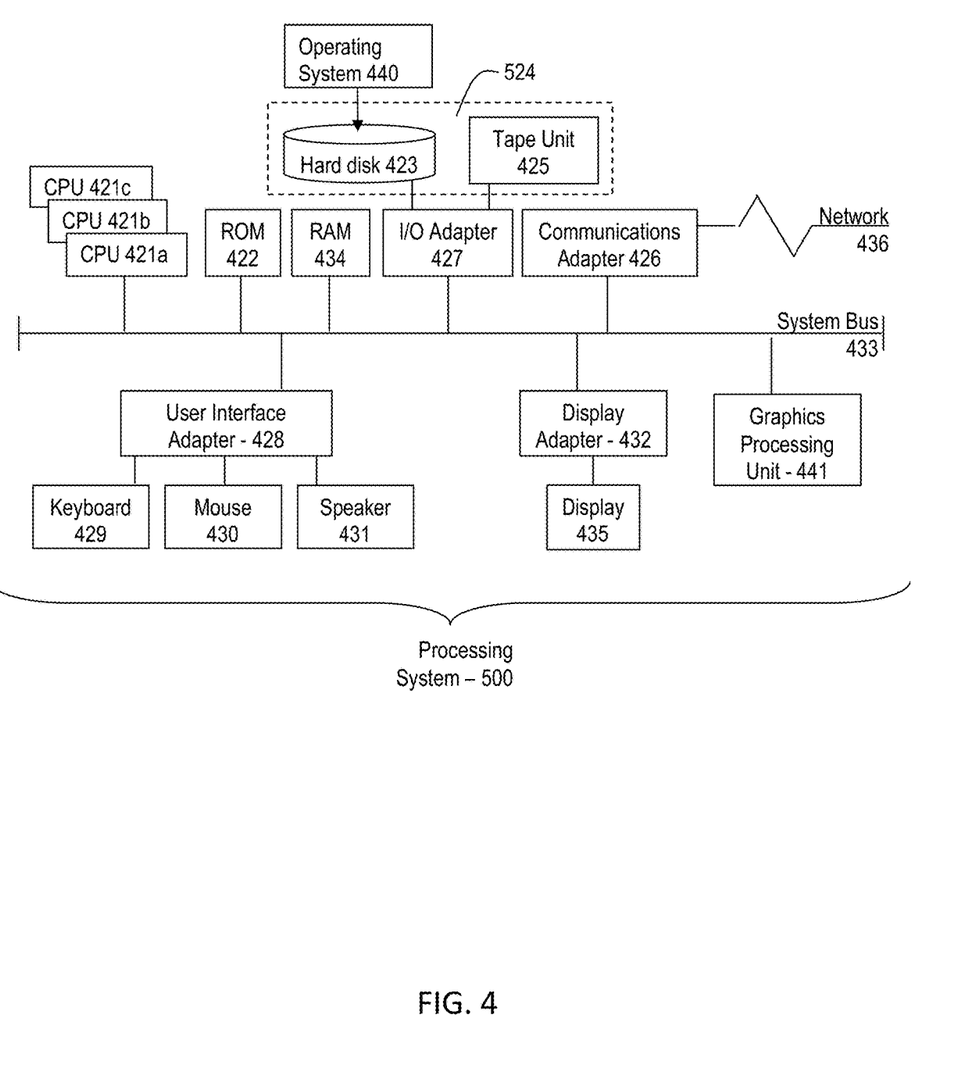
FIG. 4 illustrates a block diagram of a computer system for use in implementing one or more embodiments of the present invention.

It is understood that the present disclosure is capable of being implemented in conjunction with any other type of computing environment now known or later developed. For example, FIG. 4 depicts a block diagram of a processing system 400 for implementing the techniques described herein. In examples, the processing system 400 has one or more central processing units (processors) 421a, 421b, 421c, etc. (collectively or generically referred to as processor(s) 421 and/or as processing device(s)). In aspects of the present disclosure, each processor 421 can include a reduced instruction set computer (RISC) microprocessor. Processors 421 are coupled to system memory (e.g., random access memory (RAM) 424) and various other components via a system bus 433. Read only memory (ROM) 422 is coupled to system bus 433 and may include a basic input/output system (BIOS), which controls certain basic functions of the processing system 400.

Further depicted are an input/output (I/O) adapter 427 and a network adapter 426 coupled to the system bus 433. I/O adapter 427 may be a small computer system interface (SCSI) adapter that communicates with a hard disk 423 and/or a storage device 425 or any other similar component. I/O adapter 427, hard disk 423, and storage device 425 are collectively referred to herein as mass storage 434. Operating system 440 for execution on processing system 400 may be stored in mass storage 434. The network adapter 426 interconnects system bus 433 with an outside network 436 enabling processing system 400 to communicate with other such systems.

A display (e.g., a display monitor) 435 is connected to the system bus 433 by display adapter 432, which may include a graphics adapter to improve the performance of graphics intensive applications and a video controller. In one aspect of the present disclosure, adapters 426, 427, and/or 432 may be connected to one or more I/O busses that are connected to the system bus 433 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 433 via user interface adapter 428 and display adapter 432. An input device 429 (e.g., a keyboard, a microphone, a touchscreen, etc.), an input pointer 430 (e.g., a mouse, trackpad, touchscreen, etc.), and/or a speaker 431 may be interconnected to system bus 433 via user interface adapter 428, which may include, for example, a Super I/O chip integrating multiple device adapters into a single integrated circuit.

In some aspects of the present disclosure, the processing system 400 includes a graphics processing unit 437. Graphics processing unit 437 is a specialized electronic circuit designed to manipulate and alter memory to accelerate the creation of images in a frame buffer intended for output to a display. In general, graphics processing unit 437 is very efficient at manipulating computer graphics and image processing and has a highly parallel structure that makes it more effective than general-purpose CPUs for algorithms where processing of large blocks of data is done in parallel.

Thus, as configured herein, the processing system 400 includes processing capability in the form of processors 421, storage capability including system memory (e.g., RAM 424), and mass storage 434, input means such as keyboard 429 and mouse 430, and output capability including speaker 431 and display 435. In some aspects of the present disclosure, a portion of system memory (e.g., RAM 424) and mass storage 434 collectively store the operating system 440 to coordinate the functions of the various components shown in the processing system 400.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, by a processor, image data describing an image on a flexible display and force data describing a force applied to the flexible display, wherein the force data is received from a force unit configured to determine a magnitude and a direction of the force applied to the flexible display, wherein the magnitude is based on a velocity of a deformation of the flexible display;
   associating, by the processor, the force with a target object in the image, wherein the target object is an image of a real-world object;
   determining, by the processor based on the image data, material properties of the real-world-object; and
   creating, by the processor, a rendering of the target object based on the material properties of the real-world-object as if the force were applied to the real-world object,
   wherein the rendering of the target object includes images of the target object broken into pieces based on a determination that the force exceeded a threshold value associated with the material properties of the real-world-object.

2. The computer-implemented method of claim 1 further comprising:
   determining, based on the force data, a location of application the force on the flexible display;
   determining, based on the image data, a location of the target object on the image as displayed on the flexible display; and
   associating the force with the target object based on the location of the force matching the location of the image.

3. The computer-implemented method of claim 1 further comprising:
   determining, based on the force data, a location of deformation of the flexible display, wherein the location of the deformation is distinct from a location of the force applied to the flexible display;
   determining, based on the image data, a location of the target object on the image as displayed on the flexible display; and
   associating the force with the target object based on the location of the deformation matching the location of the image.

4. The computer-implemented method of claim 1 further comprising:
   determining, by the image data, material properties of the real-world-object; and
   creating the rendering based at least in part on the material properties.

5. A system comprising:
   a memory having computer readable instructions; and
   one or more processors for executing the computer readable instructions, the computer readable instructions controlling the one or more processors to perform operations comprising:
   receiving data describing an image on a flexible display and data describing a force applied to the flexible display, wherein the force data is received from a force unit configured to determine a magnitude and a direction of the force applied to the flexible display, wherein the magnitude is based on a velocity of a deformation of the flexible display;
   associating the force with a target object in the image, wherein the target object is an image of a real-world object;
   determining, by the processor based on the image data, material properties of the real-world-object; and
   creating a rendering of the target object based on the material properties of the real-world-object as if the force were applied to the real-world object,
   wherein the rendering of the target object includes images of the target object broken into pieces based on a determination that the force exceeded a threshold value associated with the material properties of the real-world-object.

6. The system of claim 5, the operations further comprising:
   determining, based on the force data, a location of application the force on the flexible display;
   determining, based on the image data, a location of the target object on the image as displayed on the flexible display; and
   associating the force with the target object based on the location of the force matching the location of the image.

7. The system of claim 5, the operations further comprising:
   determining, based on the force data, a location of deformation of the flexible display, wherein the location of the deformation is distinct from a location of the force applied to the flexible display;
   determining, based on the image data, a location of the target object on the image as displayed on the flexible display; and
   associating the force with the target object based on the location of the deformation matching the location of the image.

8. The system of claim 5, the operations further comprising:
   determining, by the image data, material properties of the real-world-object; and
   creating the rendering based at least in part on the material properties.

9. The system of claim 5, the operations further comprising:
   detecting, based on the image data, a second object in the image;

determining, based on the image data, whether the second object applies a second force or a reactive force on the real-world object;

creating the rendering based at least in part on the determination.

10. The system of claim 5, the operations further comprising:

determining, based on the image data, a first potential material of the target object and a second potential material of the target object; and providing a user, via a graphical user interface, a rendering based on the first potential material and the second potential material.

11. A computer program product comprising a non-transitory computer readable storage medium having program instructions embodied therewith, the program instructions executable by a processor to cause the processor to perform operations comprising:

receiving data describing an image on a flexible display and data describing a force applied to the flexible display, wherein the force data is received from a force unit configured to determine a magnitude and a direction of the force applied to the flexible display, wherein the magnitude is based on a velocity of a deformation of the flexible display;

associating the force with a target object in the image, wherein the target object is an image of a real-world object;

determining, by the processor based on the image data, material properties of the real-world-object; and creating a rendering of the target object based on the material properties of the real-world-object as if the force were applied to the real-world object, wherein the rendering of the target object includes images of the target object broken into pieces based on a determination that the force exceeded a threshold value associated with the material properties of the real-world-object.

12. The computer program product of claim 11, the operations further comprising:

determining, based on the force data, a location of application the force on the flexible display;

determining, based on the image data, a location of the target object on the image as displayed on the flexible display; and associating the force with the target object based on the location of the force matching the location of the image.

13. The computer program product of claim 11, the operations further comprising:

determining, based on the force data, a location of deformation of the flexible display, wherein the location of the deformation is distinct from a location of the force applied to the flexible display;

determining, based on the image data, a location of the target object on the image as displayed on the flexible display; and associating the force with the target object based on the location of the deformation matching the location of the image.

14. The computer program product of claim 11, the operations further comprising:

determining, by the image data, material properties of the real-world-object; and creating the rendering based at least in part on the material properties.

15. The computer program product of claim 11, the operations further comprising:

detecting, based on the image data, a second object in the image;

determining, based on the image data, whether the second object applies a second force or a reactive force on the real-world object;

creating the rendering based at least in part on the determination.

16. The computer program product of claim 11, the operations further comprising:

determining, based on the image data, a first potential material of the target object and a second potential material of the target object; and providing a user, via a graphical user interface, a rendering based on the first potential material and the second potential material.

* * * * *